US012217245B2

(12) United States Patent
Moy et al.

(10) Patent No.: US 12,217,245 B2
(45) Date of Patent: Feb. 4, 2025

(54) SYSTEMS AND METHODS FOR DISTRIBUTED LEDGER-BASED INSTITUTIONAL IDENTITY MANAGEMENT

(71) Applicant: JPMORGAN CHASE BANK, N.A., New York, NY (US)

(72) Inventors: Christine Moy, New York, NY (US); Tyrone Lobban, London (GB); George Kassis, London (GB); Vishakh Vishakh, New York, NY (US); Bhaskar Kishore, Greater Noida (IN); Navkiran Arneja, Westbury, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 107 days.

(21) Appl. No.: 17/174,650

(22) Filed: Feb. 12, 2021

(65) Prior Publication Data

US 2021/0256508 A1 Aug. 19, 2021

Related U.S. Application Data

(60) Provisional application No. 63/126,335, filed on Dec. 16, 2020, provisional application No. 62/976,262, filed on Feb. 13, 2020.

(51) Int. Cl.
*G06Q 20/36* (2012.01)
*G06Q 20/38* (2012.01)

(52) U.S. Cl.
CPC ....... *G06Q 20/3674* (2013.01); *G06Q 20/363* (2013.01); *G06Q 20/38215* (2013.01); *G06Q 20/3825* (2013.01)

(58) Field of Classification Search
None
See application file for complete search history.

(56) References Cited

U.S. PATENT DOCUMENTS

2017/0111175 A1* 4/2017 Oberhauser ...... G11B 20/00086
2017/0250972 A1 8/2017 Ronda et al.
(Continued)

FOREIGN PATENT DOCUMENTS

WO WO-2016128569 A1 * 8/2016 ............. G06F 21/33

OTHER PUBLICATIONS

Lee, J., "Collective Attestation for Manageable IoT Environments", Applied Sciences 8.12 MDPI AG. (Dec. 2018) (Year: 2018).*
(Continued)

*Primary Examiner* — Clay C Lee
(74) *Attorney, Agent, or Firm* — GREENBERG TRAURIG LLP (57) ABSTRACT

Systems and methods for distributed ledger-based identity management are disclosed. In one embodiment, a computer-based method for managing attestations may include: (1) receiving, by a computer program executed by an electronic device for an identity consumer and from an identity provider, a notification from an identity provider server that an attestation is available, wherein the attestation may be generated by the identity provider based on authorization from a system operator and may include a chain of trust comprising an identification of the system operator and the identity provider; (2) requesting, by the computer program, the attestation from the identity provider; and (3) downloading, by the computer program, the attestation to an identity consumer electronic wallet for the identity consumer. The identity provider may commit the downloading of the attestation to a distributed ledger, wherein the distributed ledger maintains a current status for the attestation.

15 Claims, 8 Drawing Sheets

(56) References Cited

U.S. PATENT DOCUMENTS

| | | | |
|---|---|---|---|
| 2017/0353435 A1* | 12/2017 | Pritikin | .................. H04W 4/02 |
| 2019/0230073 A1 | 7/2019 | Patel et al. | |
| 2019/0260594 A1* | 8/2019 | Singhal | .................. H04L 63/06 |
| 2019/0296904 A1* | 9/2019 | Smith | ................. H04L 63/0492 |
| 2020/0042958 A1* | 2/2020 | Soundararajan | ..... G06Q 20/401 |
| 2020/0076601 A1* | 3/2020 | Tabrizi | ............. G06Q 20/38215 |
| 2021/0012447 A1* | 1/2021 | Glaude | ................. H04L 9/0643 |
| 2021/0097528 A1* | 4/2021 | Wang | ................. G06Q 20/3825 |

OTHER PUBLICATIONS

International Search Report, dated Jun. 1, 2021, from corresponding International Application No. PCT/US2021/017832.

Written Opinion of the International Searching Authority, dated Jun. 1, 2021, from corresponding International Application No. PCT/US2021/017832.

\* cited by examiner

Sign A Document

Upload a document

Drag files here or browse

Attach a Credential

[ Company A  X ]   [ John Doe  X ]

Company A
Legal Entity Identifier
Company A
Delegated Reporter
John Doe
Employee
John Doe
Authorized Signer

SIGN

SYSTEMS AND METHODS FOR DISTRIBUTED LEDGER-BASED INSTITUTIONAL IDENTITY MANAGEMENT

RELATED APPLICATIONS

This application claims priority to, and the benefit of, U.S. Provisional Patent Application Ser. No. 62/976,262 filed Feb. 13, 2020 and U.S. Provisional Patent Application Ser. No. 63/126,335 filed Dec. 16, 2020. The disclosure of each is hereby incorporated, by reference, in its entirety.

BACKGROUND OF THE INVENTION

1. Field of the Invention

Embodiments are generally directed to systems and methods for distributed ledger-based identity management.

2. Description of the Related Art

In online transactions, it is difficult to know whether the other party to the transaction is who the other party purports to be, especially in person-to-person transactions. While there are some ways of verifying the identity of the other party, they are difficult, awkward, and time-consuming.

SUMMARY OF THE INVENTION

Systems and methods for distributed ledger-based identity management are disclosed. In one embodiment, a computer-based method for managing attestations may include: (1) receiving, by a computer program executed by an electronic device for an identity consumer and from an identity provider, a notification from an identity provider server that an attestation is available, wherein the attestation may be generated by the identity provider based on authorization from a system operator and may include a chain of trust comprising an identification of the system operator and the identity provider; (2) requesting, by the computer program, the attestation from the identity provider; and (3) downloading, by the computer program, the attestation to an identity consumer electronic wallet for the identity consumer. The identity provider may commit the downloading of the attestation to a distributed ledger, wherein the distributed ledger maintains a current status for the attestation.

In one embodiment, the attestation may include a license, a certificate, a credential, or an authorization.

In one embodiment, the identity provider may include one of a financial institution, a government agency, an employer, and a legal entity.

In one embodiment, the attestation may include an identification of an attestor, an identification of an attestee, a type of attestation, and a date of issuance.

In one embodiment, the method may further include providing, by the computer program, the attestation to a relying party computer application for a relying party, wherein a computer program for the relying party verifies the status of the attestation on the distributed ledger.

In one embodiment, the identity consumer electronic wallet may include a wallet application, a mobile wallet, or a web-based wallet.

According to another embodiment, a computer-based method for managing attestations may include: (1) receiving, by a computer program executed by an electronic device for an identity consumer and from a relying party computer application for a relying party, a request for an attestation; (2) retrieving, by the computer program and from an electronic wallet for the identity consumer, the attestation; and (3) sending, by the computer program and to the relying party computer application, the attestation. The relying party computer program may verify a status for the attestation using a distributed ledger.

In one embodiment, the attestation may include a license, a certificate, a credential, or an authorization, and may include an identification of an attestor, an identification of an attestee, a type of attestation, and a date of issuance.

In one embodiment, the identity consumer electronic wallet may include a wallet application or a web-based wallet.

In one embodiment, the status of the attestation may indicate whether the attestation is valid, expired, or revoked.

In one embodiment, the relying party computer application maty periodically verify the status of the attestation using the distributed ledger.

In one embodiment, the relying party may receive a notification that the attestation is revoked or expired from the distributed ledger.

In one embodiment, relying party computer program may further verify a chain of trust for the attestation, wherein the chain of trust identifies a system operator and an identity provider, wherein the system operator authorizes the identity provider to issue the attestation.

According to another embodiment, a computer-based method for sending an object using attestations may include: (1) receiving, by a computer program executed by an electronic device for an identity consumer, an identity of an object to sign; (2) receiving, by the computer program executed by an electronic device for the identity consumer, a selection of an attestation to sign the object with; (3) retrieving, by the computer program executed by an electronic device for the identity consumer, the identified object and the selected attestation; (4) signing, by the computer program executed by an electronic device for the identity consumer, the object with the attestation by embedding the attestation in the object; and (5) sending, by the computer program executed by an electronic device for the identity consumer, the signed object to a computer program executed by a device for a receiving party.

In one embodiment, the object may include a document, and the attestation attests that the identity consumer is authorized to sign the document.

In one embodiment, the object is a payment, and the attestation attests that the identity consumer is authorized to make the payment.

In one embodiment, the object may include digital currency.

In one embodiment, the attestation may include a license, a certificate, a credential, or an authorization, and may include an identification of an attestor, an identification of an attestee, a type of attestation, and a date of issuance.

In one embodiment, the method may further include receiving, by the computer program executed by an electronic device for the identity consumer and from the computer program executed by a device for a receiving party, a request for the object and the receiving party attestation; and verifying, by the computer program executed by an electronic device for the identity consumer, a status of the receiving party attestation using a distributed ledger before sending the object to the receiving party.

In one embodiment, the receiving party attestation may attest to an account for the receiving party.

BRIEF DESCRIPTION OF THE DRAWINGS

In order to facilitate a fuller understanding of the present invention, reference is now made to the attached drawings.

The drawings should not be construed as limiting the present invention but are intended only to illustrate different aspects and embodiments.

DETAILED DESCRIPTION OF PREFERRED EMBODIMENTS

The disclosures of U.S. Provisional Patent Application Ser. No. 62/972,560 filed Feb. 10, 2020, U.S. patent application Ser. No. 16/878,457, filed May 19, 2020, and of U.S. Patent Application Ser. No. 62/850,181, filed May 20, 2019, are hereby incorporated, by reference, in their entireties.

Embodiments are directed to systems and methods for distributed ledger-based institutional identity management. In embodiments, an identity provider may provide attestations that a user (e.g., a company, an individual, etc.) is who the user purports to be. For example, a user may receive an attestation from the identity provider. After the user's identity is verified (e.g., Know Your Customer legal (KYC) requirements and/or other institutional requirements, etc. are satisfied), the identity provider may issue the attestation, and the user may store the attestation in, for example, the user's digital wallet. The user may provide the attestation to a relying party, such as a financial institution, governmental agency, company, etc. for identity verification.

In one embodiment, the attestation may be issued to a user, a user entity (e.g., a business unit, subsidiary, etc.), an individual within the user entity, etc. The attestations may be provided at an entity level, group level, individual level, etc.

Multiple types of attestations may be used. Examples of attestations include a LEI attestation from a Local Operating Unit (LOU), an authorized signer attestation from an employer, KYC attestations, authorized payor attestations, etc. Any suitable attestation may be used as is necessary and/or desired.

In embodiments, the relying parties may know with guaranteed confidence that the attestation being provided is factually correct and verified because it may be backed by a chain of trust. A chain of trust occurs when one individual or entity identifies another individual or entity by authorizing them to claim an attestation using the user's email address and a one-time passphrase issued only to that individual. That individual or entity may now use that attestation to issue another attestation. By receiving the previous attestation, the individual or entity, any subsequently-issued attestations build and expand on the chain of trust. For example, a new attestation may build upon a prior attestation, thereby creating the chain of trust.

In one embodiment, automatic notifications that something about the company has changed (e.g., they have been bought by another company, key employee moved, etc.) may be provided. For example, a notice, a revocation, etc., may be provided. The use of a distributed ledger provides the ability to reflect changes to attestations in real-time which entitled participants may access.

In one embodiment, the status of the attestations may be recorded on the distributed ledger. So, when an attestation is revoked, this will be reflected in real-time on the distributed ledger. Any user(s) or relying parties may be notified of the revocation by, for example, push notification. In another embodiment, when the user or a relying party attempts to access or user the attestation, the user or relying party's wallet service may access the distributed ledger and determine that the attestation has been revoked.

Figure 1:
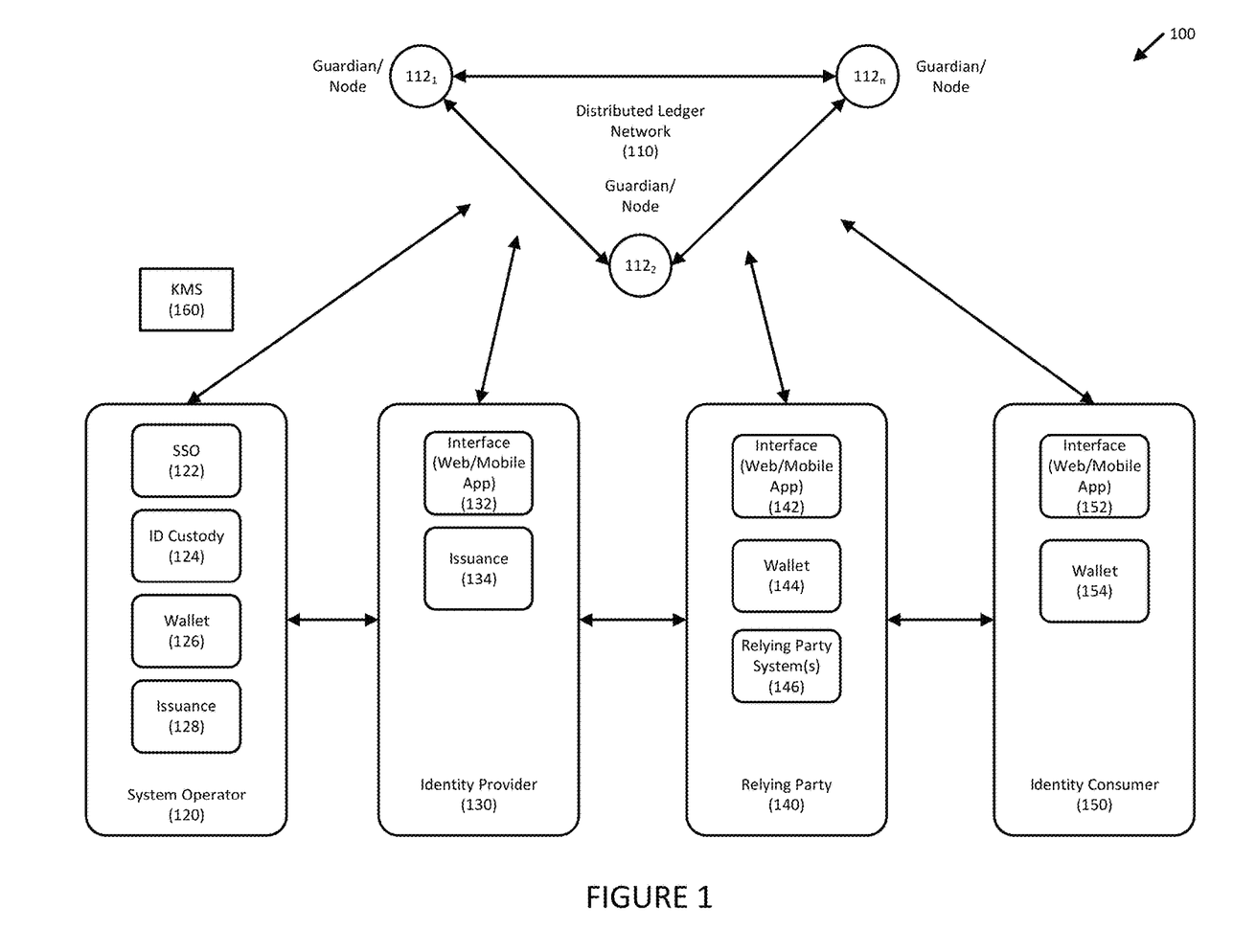
FIG. 1 depicts a system for distributed ledger-based identity management is provided according to an embodiment.

Referring to FIG. 1, a system for distributed ledger-based institutional identity management are provided according to one embodiment. System 100 may include distributed ledger network 110, system operator 120, identity provider 130, identity consumer 150, relying party 140, and key management service 160. Distributed ledger network 110 may be any suitable network that can receive and store data in an immutable and cryptographically-verifiable manner. Examples include Quorum, Blockchain-based networks, etc.

Distributed ledger network 110 may include a plurality of guardians or nodes $112_1, 112_2, \ldots 112_n$. Nodes/guardians $112_1, 112_2, \ldots 112_n$ may include a node on the distributed ledger network, or a guardian that be an entity, code, etc. that may include one or more nodes on the distributed ledger network. A guardian may be an entity that is trusted by network participants and non-network participants. Thus, rather than having its own node, an identity provider, a relying party, and/or a user may access the distributed ledger network via the guardian. The guardians may directly update and/or query the distributed ledger.

In embodiments, if an entity uses a trusted guardian, that entity does not need to participate via a dedicated node to, for example, verify an attestation, revoke an attestation, etc.

In embodiments, any entity may still participate directly in distributed ledger network 110 as a node.

Although certain parts of this disclosure reference a blockchain, it should be recognized that the disclosure is not limited to blockchain only, and any suitable distributed ledger system may be used as is necessary and/or desired.

System operator 120 may be an entity that provides a root attestation for identity providers 130 to nest attestations in. For example, system operator 120 may be a financial institution or other entity that may verify that one or more identity providers 130 is authorized to issue an attestation for identity consumer 150.

System operator may include single-sign on (SSO) module 122, ID custody module 124, wallet module 126 (e.g., web wallet, mobile wallet), and issuance module 128. SSO service 122 may use, for example, OAuth, to log various parties into the system. It may be run by multiple parties for various reason, thereby permitting the modules to be run by different entities.

SSO module 122 may be used to authenticate into the web/mobile wallet using a single sign on. For example, an entity may be authenticated once and that authentication may be applied to other entities in system 100.

ID custody module 124 may store encrypted attestations and keys for back up purposes and to enable users to access web/mobile wallets across browsers, and a wallet service that hosts the wallet user interface.

Wallet module 126 may serve as a wallet for system operator 120.

In one embodiment, wallets 126, 144 and/or 154 may be encrypted, may be accessed using a password, etc.

Issuance module 128 may be responsible for issuing or revoking attestations. It may further issue or revoke root attestations to identity providers 130. Issuance module 128 may be available to other entities (e.g., identity providers 130, relying parties 140, identity consumers 150, etc.).

Identity providers 130 may include financial institutions, companies, employers, educational institutions, government agencies, etc. In general, any entity that can attest to something about the user may be an identity provider 130. For example, an employer may attest that an employee works for the employer; a state may issue a driver's license attestation to a driver; a tax authority may provide a user with a tax number may attest to the user's tax status; etc.

In one embodiment, identity provider 130 may be provided as a generic web service that may be configured to generate a specific kind of attestation. For example, a state's department of motor vehicles may issue attestations for driver's licenses; a Local Operating Unit (LOU) approved by the Global Legal Entity Identifier Foundation (GLEIF) may issue Legal Entity Identifiers (LEIs) attestations, etc. Each identity provider 130 may run an instance of issuance service 128, and the type of attestations issued by any instance may be controlled by the system owner specifying what they are authorized to issue.

In another embodiment, identity provider 130's issuance service 134 may be systematically incorporated with identity provider 130's systems. This may result in attestations be issued in a more systematic way without needing to access a website to issue and revoke credentials In one embodiment, only certain entities may be authorized to issue certain types of attestations. For example, a driver's license attestations may only be issued by a state department of motor vehicles. A social security number attestation may only be issued by the social security administration. The types of attestations that each identity provider is authorized to issue may be controlled by system operator 120.

In one embodiment, some attestations may be nested. For example, an attestation issued by a first entity may be nested with an attestation issued by a second entity to the first entity to authorize the first entity to issue attestations. The number of levels of nesting may depend on the number of authorizing entities. The nesting of attestations builds the chain of trust.

For example, Entity 1 may issue an attestation to Entity 2. Based on this, Entity 2 can now issue an attestation to Entity 3. The chain of issuing attestations may continue in this manner.

Identity providers 130 may include interface 132, which may be a web or mobile device interface, and issuance service 134. Interface 132 may send and receive communications to system operator 120, identity consumer 150, and/or relying party 140, including requests to issue attestations, notices of the availability of attestations, etc. Interface 132 may further interface with distributed ledger network 110 to verify the status (e.g., valid, expired, revoked, etc.) for attestations.

Identity providers 130 may be provided with key management service ("KMS") 160 or similar service for management of keys used to access the user's wallet and attestations. In another embodiment, each identity provider 130 may include a hardware security module or any suitable secure storage device that holds the keys for any automated signing actions.

System 100 may further include a plurality of relying parties 140. One relying party 140 may seek to verify something about identity consumer 150, such as the user's employment, education, licenses, etc.

For example, relying party 140 may be a financial institution, a government agency, a company, etc.

Relying party 140 may include one or more system 146, such as an onboarding team, a signing team, etc., that may rely on an identity attestation issued by identity provider 130. Relying party 140 may include interface 142, which may be similar to interface 132, discussed above.

Relying party 140 may further include wallet 144 that may store its own attestations, and may also receive attestations for one or more identity consumer 150.

Relying party 140 may check (e.g., manually or systematically), using, for example, interface 142, the messaging service, etc., the chain of trust to confirm that the attestation being presented by identity consumer 150 has indeed come from an appropriate identity provider 130, is authentic, has not been revoked, etc. Relying party 140 may also review the attestation's chain of trust to confirm that the identity provider 130 is authentic and authorized to issue the attestation.

System 100 may further include a plurality of identity consumers 150. Identity consumer 150 may be an individual, a company, etc. In one embodiment, identity consumer 150 may be identified by name.

In one embodiment, identity consumer 150 may request or claim one or more attestations directly from one or more identity provider 130. For example, one identity provider 130 may communicate a notification to identity consumer 150 to claim an attestation by email, text message, or any other suitable communication channel. As another example, identity consumer 150 may request one or more attestation from identity provider 130 using any suitable communication channel.

Identity consumer 150 may be provided with interface 152, which may be similar to interface 132, discussed above. Identity consumer may further include wallet 154 that may store attestations issued by one or more identity provider 130. Identity consumer 150 may share attestation(s) with relying party 140 via the messaging service.

Identity consumer 150's wallet 154 may include a key pair (public key and private key) at a top level, a digital identity for the user, and then attestations for the user. An example of a digital identity is described in U.S. patent application Ser. No. 16/878,457, filed May 19, 2020, and U.S. Provisional Patent Application Ser. No. 62/850,181, filed May 20, 2019, the disclosures of which are hereby incorporated, by reference, in their entireties.

In one embodiment, wallet 154 may be a web or mobile wallet, an application, etc. The web/mobile wallet may be, for example a browser-based wallet for institutional users (e.g., it can be accessed by the institutional users from within their organization). The web/mobile wallet may be hosted by any actor in the system, including distributed ledger participants and non-participants.

Attestation from wallet 154 may be uploaded from one device (e.g., a computer) via, for example HTTPS, and may be downloaded to another device, also by HTTPS. Wallets 154 may be stored encrypted in the browser of the devices unless they are decrypted by the wallet owner.

The web/mobile wallet may request and store attestations for identity consumer 150. It may further store digital assets, such as digital currencies, digital collectables (e.g., loyalty point tokens, digital art tokens, etc.). It may further send and receive digital assets to other distributed ledger-based accounts.

In embodiments, the web wallet may enable attestations and keys to be used for signing documents, and it may maintain a history of attestations received and used by the wallet and/or associated identity consumer 150.

In embodiments, identity consumer 150 may access the web/mobile wallet and may send an attestation along with payment instructions to a digital currency API. The payment instructions may include a payment amount and a type of currency used (e.g., fiat or digital).

In embodiments, an audit trail of who signed the document, when the document was signed, who accessed the document, etc. may be maintained. In one embodiment, the identifier of the signor may be masked from unentitled entities.

In one embodiment, at time of signing, the current chain of trust may be captured. Therefore, if the signer's attestation is revoked later, any relying party 140 may verify that the attestation and/or the chain of trust was valid at the time of signing.

In an embodiment, a wallet library (not shown) that may include plurality of wallets 154. The wallet library may be a general purpose front-end library for all wallet functions, including generating, storing and fetching keys, attestations, etc.

The wallet library may be used by wallet instances, attestation services, and applications that may use attestations. In one embodiment, the wallet library may communicate with identity custody service 124 to store and retrieve identity consumer 150's keys and may provide other key management services. In another embodiment, the wallet library may communicate with any suitable secure key management system. It may further communicate with the distributed ledger network, for example, on behalf of the identity custody service and any other service.

Identity consumer 150 may sign a document of any type using any attestations in wallet 154. For example, identity consumer 150 may sign using the interface by selecting the attestation in wallet 154 and signing the document with the attestation. Signing the document embeds the attestation into the document. Relying party 140 may verify the signatures (either manually or systematically) by checking the chain of trust to confirm, for example, that the signer is who the signer attests to being, that the signer is authorized to sign the particular document, etc.

In embodiments, relying party 140 may request identity consumer 150's specific attestation in order to perform specific tasks (e.g., check for Chartered Financial Analyst attestation). For example, relying party 140 may request this via wallet services, or any other suitable interface (e.g., a website), and may use an identifier, such as a QR code or similar from identity consumer 150.

As an illustrative example, relying party 140 may be looking to employ an accountant on, for example, a website. Identity consumer 150 applies, and relying party may request identity consumer 150's resume and chartered accountancy certificate. Assuming that identity consumer 150 has claimed this attestation from the identity provider (e.g., an accountancy body), identity consumer 150 may provide the attestation for his or her certificate to relying party 140.

In embodiments, websites, such as those for recruitment websites, educational institutions, employers, etc., may connect with wallets 154 so identity consumers may share their relevant attestations with potential relying parties.

As another illustrative example, if identity consumer 150 were interviewing in person with relying party 140, using an electronic device, identity consumer 150 may generate a machine-readable code, such as a bar code, QR code, etc. to communicate any relevant attestations to relying party 140. Relying party 140 may scan the machine-readable code using an electronic device to receive the attestation and/or receive a link to access/download the attestation.

In one embodiment, the web wallet may enable identity consumer 150 to send a payment request to another user, and attach attestations about themselves in that request, such that the recipient can prove that the payment request came from the expected requestor. The request may be created such that the recipient may use the mobile wallet to verify the attestation's chain of trust, and enable easy payment by presenting a mechanism to make the payment without error.

In embodiments, embodiments may work with existing systems. For example, identity consumer 150 may provide an attestation for employment to a bank (e.g., a home lending team), which may expedite the part of the home lending process.

In one embodiment, delegated reporting may be provided. For example, a client of relying party 140 and/or identity consumer 150 may issue a delegated reporting credential to the entity allowing that entity to report actions such as trades, on behalf of the client to a third party.

Embodiments may be integrated into existing systems such that the existing systems may automatically request attestation(s) from identity consumer 150 as is necessary and/or desired.

Figure 2:
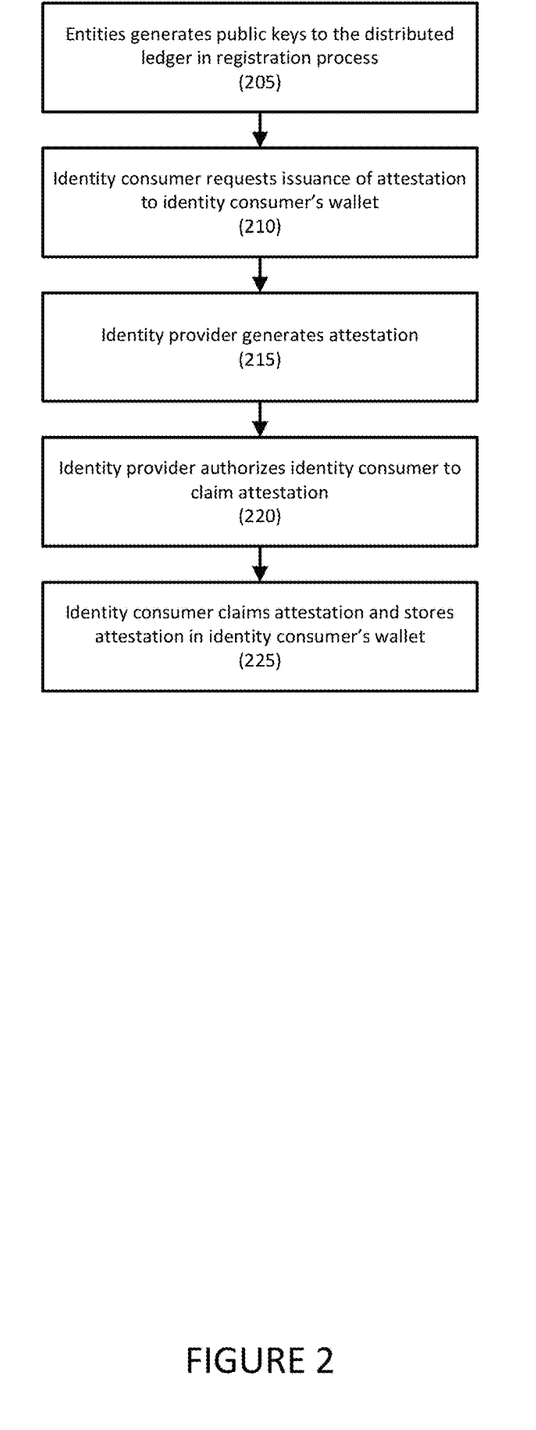
FIG. 2 depicts a method for management of attestations is provided according to one embodiment.

Referring to FIG. 2, a method for issuing attestations for institutional identity management is provided according to one embodiment.

In step 205, an identity provider, a relying party, and an identity consumer may make their public keys available on the distributed ledger network. In one embodiment, the public keys may be distributed to all distributed ledger network participants via nodes, guardians, APIs, etc.

For example, when an identity provider, a relying party, and an identity consumer signs up for the attestation service, the entities may provide an email address, a phone number, etc. The email address may populate a registry that links the entity's email address, phone number, or other identifier to the entity's digital identifier, or DiD. Thus, when participants want to find each other, they only need to know the other party's name, email, phone number, public key, or other identifier.

In step 210, the identity consumer may optionally request issuance of an attestation from the identity provider. In one embodiment, the identity consumer may request the attestation from the identity provider a separate communication network, such as an off-chain channel.

In another embodiment, the identity consumer may request the attestation from the identity provider.

In another embodiment, the identity consumer may receive a communication from the identity provider notifying the identity consumer of the availability of an attestation to claim. For example, an employer may issue attestations to its employees without having the employees individually requesting their attestations.

The communication may be in an email, a SMS message, etc. that may include a code, such as a one-time passcode or similar, for claiming or retrieving the attestation.

In another embodiment, the attestations may be automatically provided to the identity consumer's wallets.

In one embodiment, the notification of the availability of the attestation and/or the request for the attestation may be committed to the distributed ledger by, for example, the node or guardian, wallet services, etc.

The attestation may include attestations issued by an identity provider, such as a financial attestations issued by financial institutions (e.g., KYC), attestations issued by government agencies (e.g., licenses, certificates, etc.), onboarding attestations, authorizations to consume a product or service attestations, authorized signer for a corporate entity attestations, Legal Entity Identifier (LEI) according to an identity provider attestations, employee authorization attestations, employment status attestations, etc. The identity provider may provide attestations for anything that a relying party may verify in order to rely on. Any suitable attestation may be used as is necessary and/or desired.

In step 215, the identity provider may generate and/or retrieve an attestation for the identity consumer. If the identity consumer is an individual requesting an attestation for an organization (e.g., an employee is requesting an attestation to act on behalf of a company), the institutional identity may validate the individual's authority to request the attestation. In one embodiment, the identity provider may validate the identity consumer's digital identity as part of this process.

In one embodiment, the attestation may include an identification of the attestor (e.g., the attestor's name, digital identifier, or other suitable identifier), an identification of the attestee (e.g., the attestee's name, digital identifier, or other suitable identifier), the type of attestation (e.g., employment, license, account owner, etc.), date of issuance, date of expiration, etc.).

In one embodiment, the contents of the attestation may be configurable as desired and/or agreed upon by the entities.

In one embodiment, the attestation may be part of a chain of trust. For example, the attestation may identify a chain of attesters that may be involved in the attestation, such as if multiple levels of attestation are required.

In step 220, the identity provider may authorize the identity consumer to claim the attestation.

In step 225, the identity consumer may claim the attestation and may store the attestation in the identity consumer's wallet. For example, the identity consumer may download the attestation to the identity consumer's wallet.

In one embodiment, the identity provider may provide the attestation as a service to other relying parties or institutions. For example, instead of performing its own KYC investigation, a financial institution may have another financial institution or service perform a KYC investigation, and may receive a KYC attestation from the identity provider.

Figure 3:
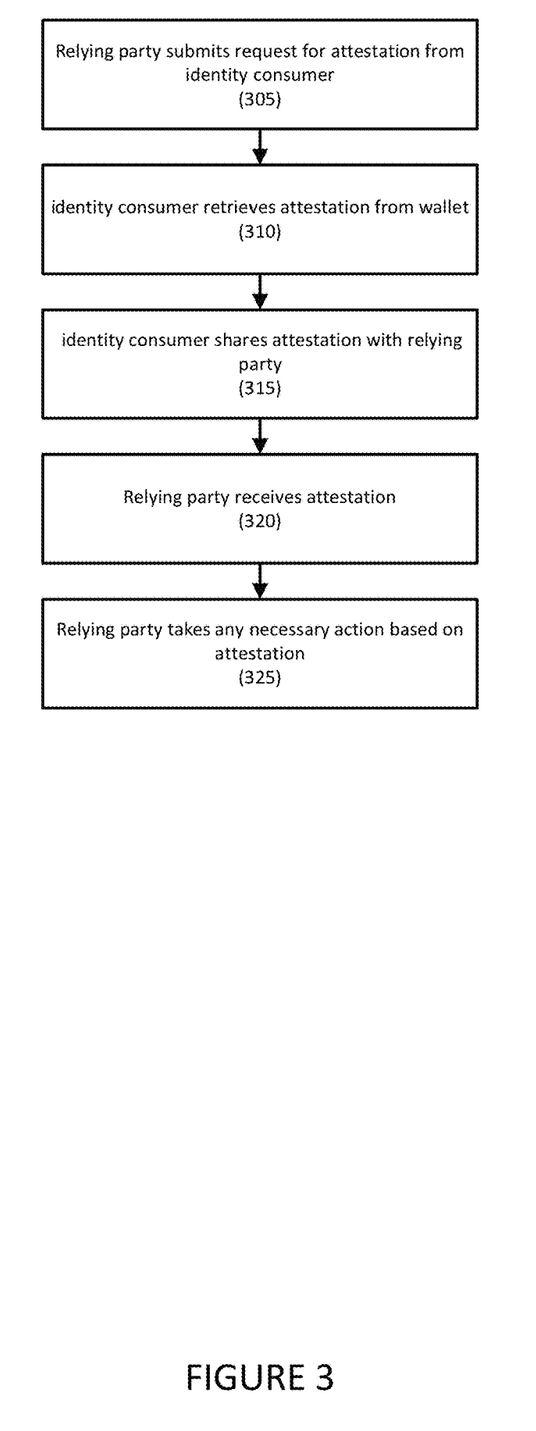
FIG. 3 depicts a method for attestation verification according to an embodiment.

Referring to FIG. 3, a method for providing attestations for institutional identity management is provided according to one embodiment.

In step 305, an identity consumer may seek to interact with a relying party as part of a new relationship, an existing relationship, etc.), and the relying party may request the attestation from the identity consumer. The relying party may submit the request for the attestation to the identity consumer via any suitable communication channel.

In step 310, the identity consumer may receive the request, and may retrieve the relevant attestation from the identity consumer's wallet. If the identity consumer does not have the relevant attestation in its wallet, it may request an attestation from the appropriate identity provider using, for example, the method of FIG. 2.

In step 315, the identity consumer may share the attestation with the relying party using any suitable communication channel.

In step 320, the relying party may receive the attestation, and may verify that the attestation is active and legitimate. In one embodiment, the distributed ledger and the chain of trust verifies the attestation. The relying party may see/check the validity of the attestation as desired. For example, a graphical indication may be provided near the attestation (e.g., a checkmark). The relying party may still view the details of the chain of trust if desired.

In one embodiment, the relying party's wallet service may periodically check the distributed ledger to see if the attestation(s) that it has received are valid and have not been revoked. Once revoked, the relying party may be notified of such by message, by a notification in the relying party's wallet, etc.

In one embodiment, the relying party may also verify that the attestation's chain of trust is valid using, for example, the chain of trust on the distributed ledger. The verification may be manual, systematic, etc. For example, it may check that each entity in the chain of trust is valid, existing, and in good standing. If all attestations that were assigned by each party up the chain of trust are valid and active, then the verification is complete.

In step 325, may take any necessary action based on relying on the attestation, such as confirming the underlying information the attestation for a separate system (e.g., confirm the identity consumer's employment with a lending system).

In one embodiment, the attestation process may be linked to payments, including distributed ledger-based payments, cryptocurrency payments, stablecoins, etc. For example, the attestation may be used to attest to identities of the parties to a transaction. If an attestation has been revoked, then the relying party can see that it has been revoked by looking at the chain of trust and therefore not make the payment or conduct the transaction. This illustrates the value of attestations and real-time revocation logic have in the payments process. This may make it difficult for malicious actors to sign documents they are not supposed to, to request payments that they should not be requesting, to pretend to work for a team that they no longer work for, to claim an attestation that has not been issued (e.g., a degree), etc.

In one embodiment, the attestation may be used to attest to certain data or data fields in a document. For example, an identity consumer may wish to have its tax id verified. In one embodiment, the identity consumer may provide an official document with the data or data field included, and the identity provider may extract and verify the data or data field. The identity provider may hash the document, data, and/or data field and provide an attestation that may include or be associated with the hash. The attestation may further include a pointer to the document, data, and/or data field that may be stored in a separate storage location.

In one embodiment, some of the institutions and/or identity consumers may be notified if an identity consumer's attestation changes. For example, if something changes with the identity consumer that would require re-miming the attestation checks, the institutions and identity consumers that may have interacted with the identity consumer may be informed that the attestation is revoked, withdrawn, or no longer valid. In one embodiment, the wallet services for the relying parties and/or identity consumers may periodically check the attestations in their wallets and notify the relying parties and/or identity consumers should an attestation be revoked, expired, changed, is otherwise no longer valid, etc. In embodiment, this may trigger an automatic request from the identity consumer to the identity provider for a new or updated attestation, or a request from the relying party to the identity consumer to request a new or updated attestation.

In embodiments, one or more smart contracts may be used to, for example, enforce policies. For example, a smart contract may be used to enforce any of Employee A's company policies. For example, Employee A's company may require that certain transactions be signed by multiple employees, a minimal level for the employees, etc. The smart contract may maintain and enforce these policies as is necessary and/or desired.

In another embodiment, a smart contract may maintain or may access a list of individuals that are authorized to sign on behalf of an organization. The list may be provided by the organization. A relying party seeking to verify the authority of an individual may provide an identifier to the smart contract, and the smart contract may determine if the individual is authorized, and what other policies may need to be met.

Figure 4:
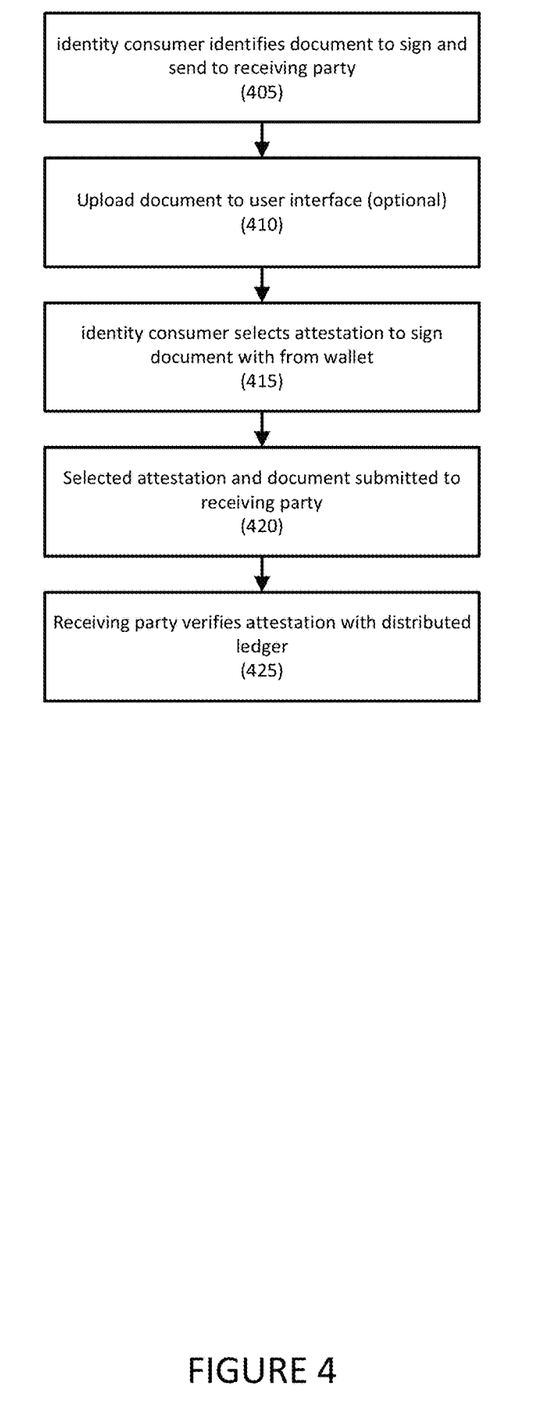
FIG. 4 depicts a method for document signing with an attestation according to an embodiment.

Referring to FIG. 4, a method for signing a document with an attestation for identity management is provided according to one embodiment.

In step 405, using an interface, an identity consumer may identify a document to sign and send to a receiving party. For example, the identity consumer may use any suitable interface presented on any suitable electronic device to identify the document.

Figure 5A:
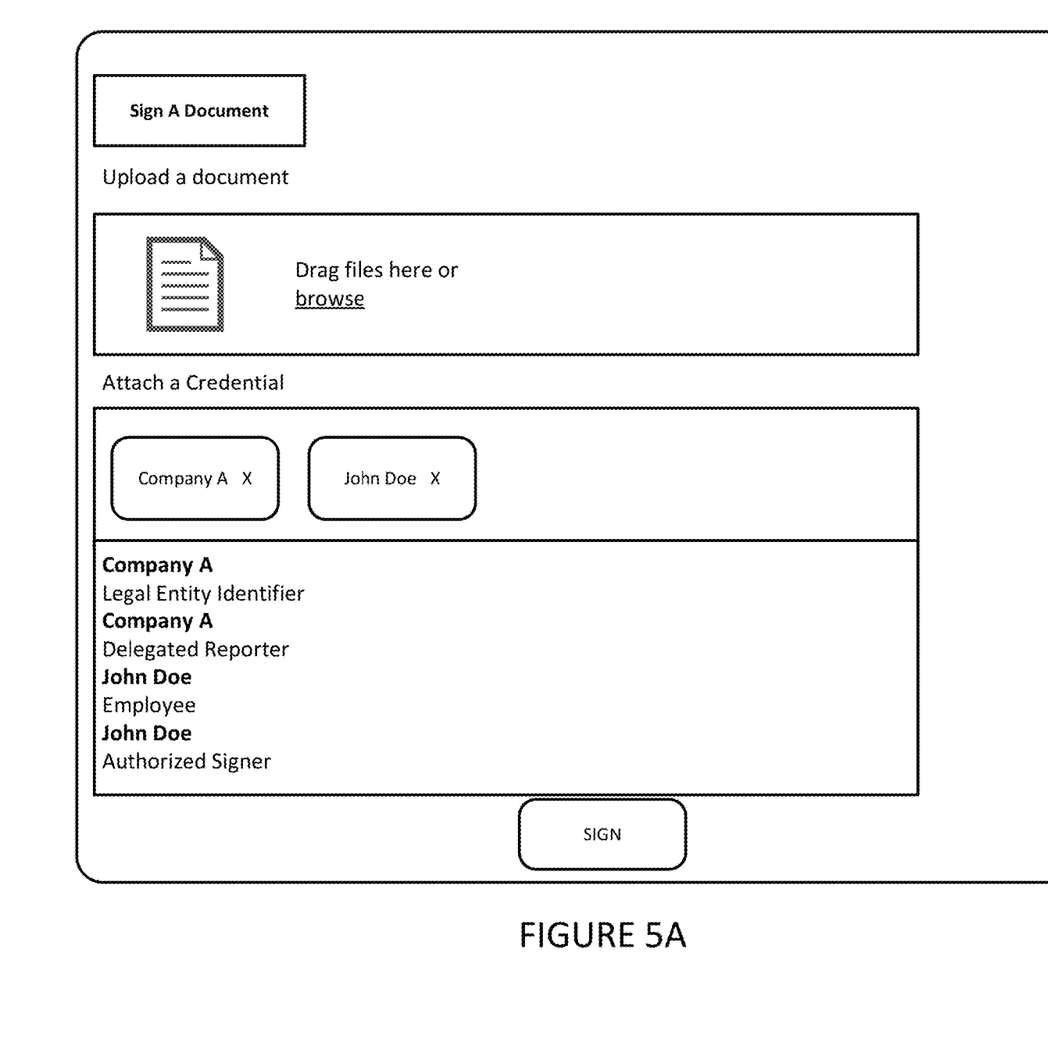
FIG. 5A is an illustrative example of a signing interface according to an embodiment.

An illustrative example of a signing interface is provided in FIG. 5A.

In one embodiment, the document may be provided by a counterparty to a transaction, and may be provided, for example, by email.

In step 410, if necessary, the document may be uploaded to the interface.

In step 415, the identity consumer may identify an attestation to sign the document with, such as an attestation to the individual's identity, an attestation to the individual's authority to sign the document, etc. In one embodiment, the attestation may be stored in the identity consumer's wallet. For example, the identity consumer may select the attestation(s) that are most relevant to the document (e.g., if the identity consumer is signing as an authorized assignee of a company, the identity consumer may select the attestation that attests to the identity consumer's signatory authority).

In one embodiment, a smart contract model may be used to verify the identity consumer's authorization to sign a document. For example, a public registry that identifies the authorized individuals may be provided, and a smart contract may verify that an individual is authorized to sign. In one embodiment, the public registry may determine whether the selected attestation is correct and authorized to sign, access, or perform any sort of function.

In step 420, the identity consumer may digitally sign the document and attestation(s) and may provide the attestation(s) and document to the receiving party. In one embodiment, the attestation may be embedded within the document.

In another embodiment, a hash of the document, or other suitable identifier, and the attestation, may be written to the distributed ledger. The hash may be used to verify that the signed document has not been altered or changed.

In step 425, after receiving the document and selected attestation, the receiving party may validate the attestation. For example, the receiving party's wallet services may automatically check with the distributed ledger to verify that the attestation has not expired, been modified, or been revoked.

In one embodiment, the distributed ledger and the chain of trust may verify the attestation. The receiving party may see/check the validity of the attestation as desired. For example, a graphical indication may be provided near the attestation (e.g., a checkmark). The receiving party may still view the details of the chain of trust if desired.

Figure 5B:
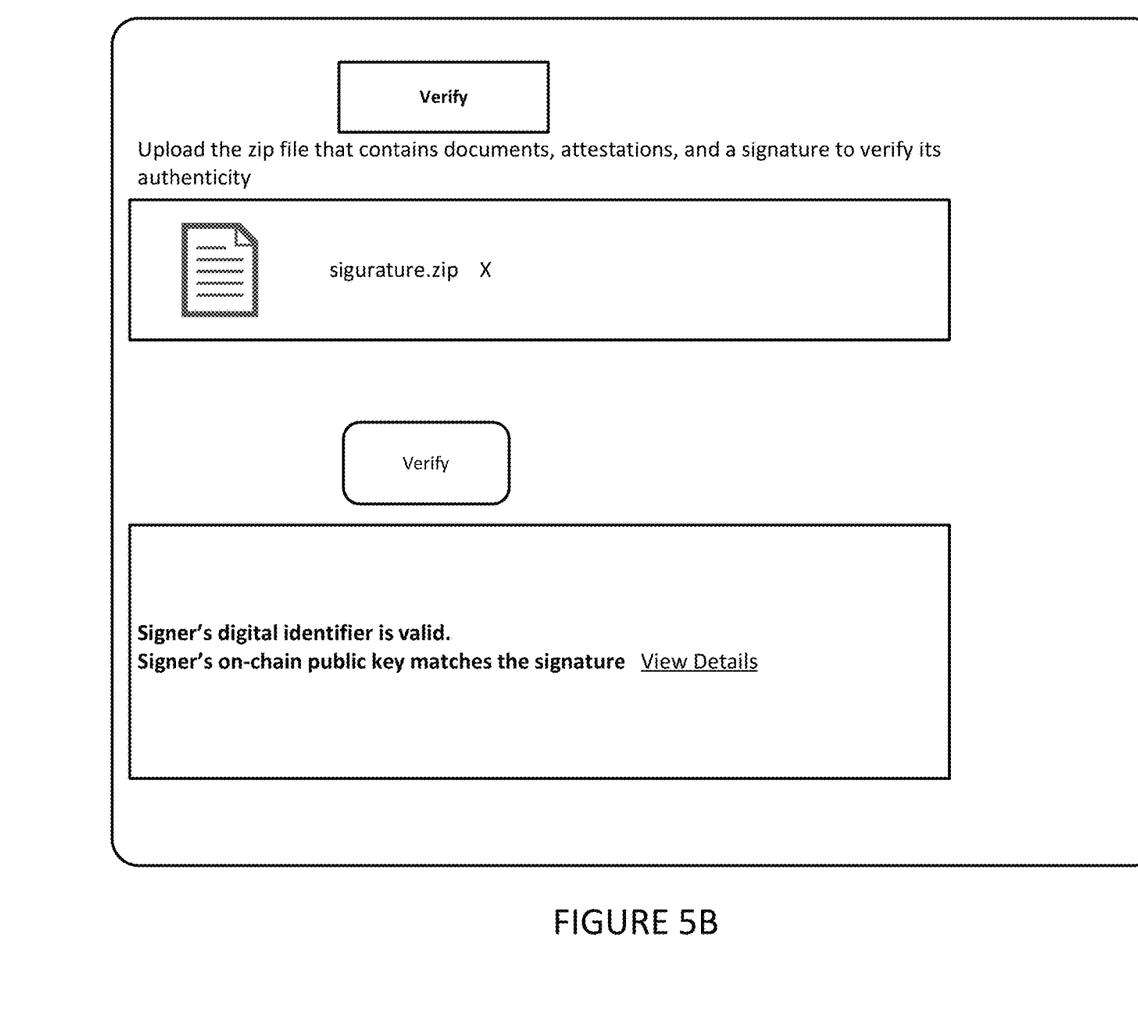
FIG. 5B is an illustrative example of a validation interface according to an embodiment.

An illustrative example of a validation interface is provided in FIG. 5B.

Figure 6:
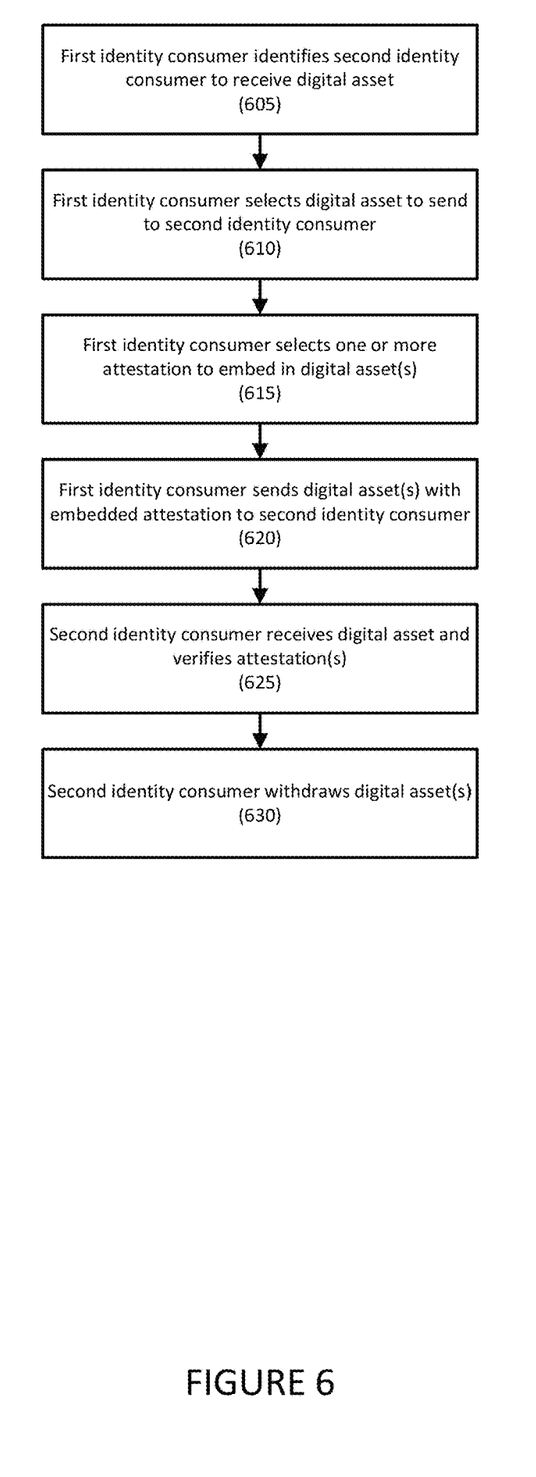
FIG. 6 depicts a method for payment using institutional identity management according to an embodiment.

Referring to FIG. 6, a method for payment using institutional identity management is disclosed according to an embodiment. For example, identity consumers having wallets that hold their digital assets and digital attestations may pay each other without having to go through traditional payment channels, such as ACH, wire, etc.

In one embodiment, in step 605, using a wallet, a first identity consumer may identify a recipient for a payment. In one embodiment, the first identity consumer may identify the second identity consumer using an email address, phone number, digital identifier, machine-readable code, etc.

In one embodiment, the first identity consumer may receive a payment request from the second identity consumer. This request can be coupled with an attestation which the first identity consumer can see (e.g., details and the Chain of Trust). In one embodiment, the distributed ledger and the chain of trust verifies the attestation. The identity consumers can see/check the validity of the attestation. For example, a graphical indication may be provided near the attestation (e.g., a checkmark). The identity customer may still view the details of the chain of trust if desired.

In step 610, once the wallet identifies the second identity consumer, the first identity consumer may select the digital asset or stablecoins to send to the second identity customer. In one embodiment, the first identity consumer may then sign or attach the digital asset/stable coins with a selected attestation.

In step 615, the first identity consumer may select one or more attestation to embed in the digital asset/stablecoins.

In step 620, the first identity consumer may send the digital asset with the embedded attestation(s) to the second identity consumer.

In step 625, the second identity consumer may receive the digital asset and may verify the attestation, such as by verifying the chain of trust on the distributed ledger. For example, the second identity consumer's wallet services may automatically check with the distributed ledger to verify that the attestation has not expired, been modified, or been revoked.

In one embodiment, the distributed ledger and the chain of trust may verify the attestation. The second identity consumer may see/check the validity of the attestation as desired. For example, a graphical indication may be provided near the attestation (e.g., a checkmark). The second identity consumer may still view the details of the chain of trust if desired.

In step 630, the second identity consumer may then withdraw the amount from the second identity consumer's wallet into a bank account as desired.

Figure 7:
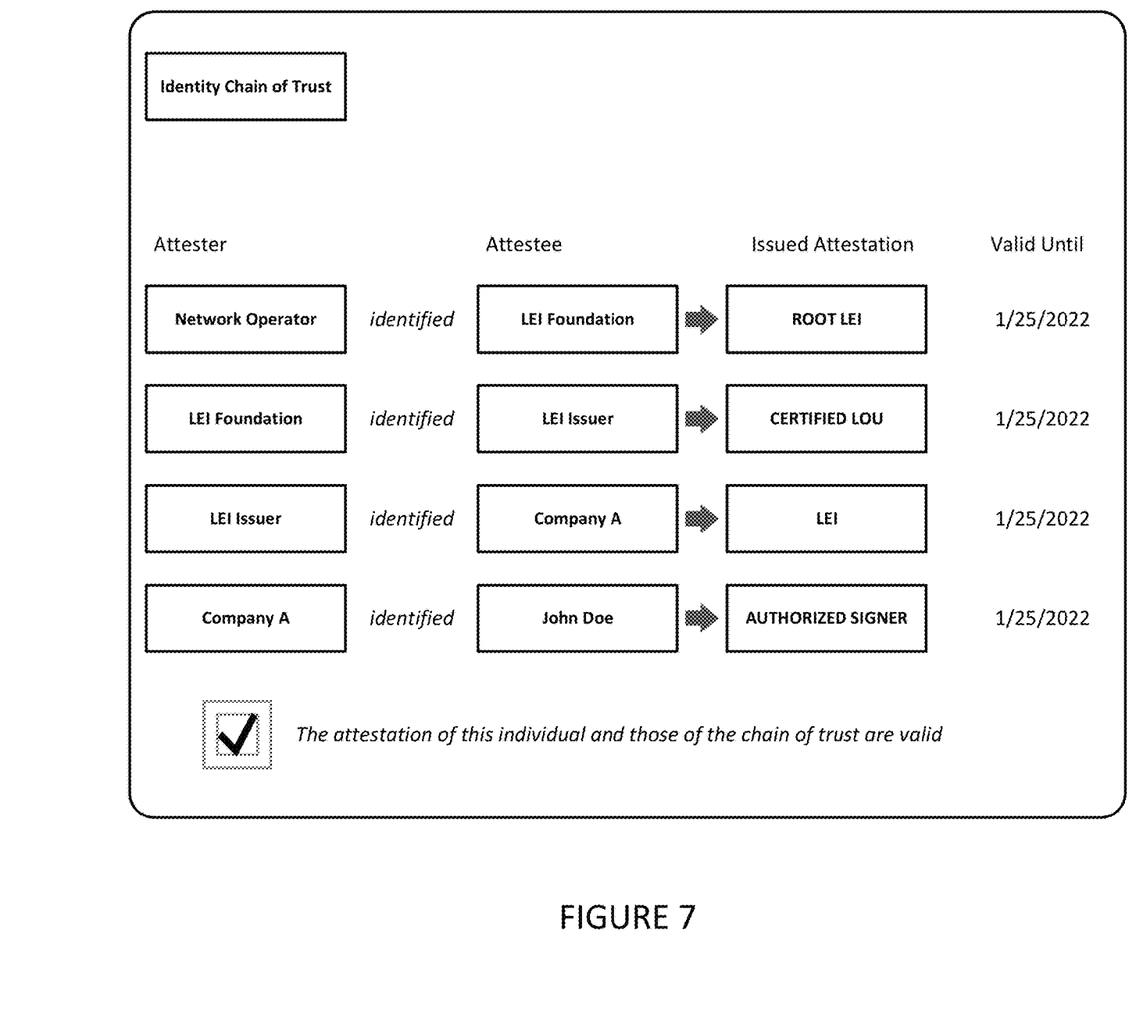
FIG. 7 depicts an exemplary chain of trust according to an embodiment.

FIG. 7 depicts an exemplary of a chain of trust according to an embodiment. For example, the chain of trust starts with the system owner using an issuance service to identify/authorize the identity provider to claim a root attestation. The identity provider then uses its issuance service to identify/authorize the next party (e.g., Local Operating Unit, or "LOU") to claim its Certified LOU attestation. The LOU then uses its issuance service to identify/authorize a corporation its LEI VC, and the Corporation then uses its issuance service to identify/authorize their employee to claim their employee/entitlements attestation. The entities in FIG. 7 and this description are exemplary only, and it should be understood that different entities may be used throughout to also form a chain of trust, but the architectural flow may look the same.

Attestations may be shared from the wallet by the identity consumer with other websites to enable multiple functions, such as a supplier using its LEI attestations to onboard with a buyer, an individual proving his or her employment to the loan provider by showing an employee attestation, or a customer using a DMV attestation to prove his or her age). These are exemplary only. Thus, the wallet may be used in, and linked with, many websites to simplify and streamline several processes. The wallet may also be used in person using, for example, a QR code or any other suitable mechanism.

In another embodiment, an identity consumer may use an attestation from the attestation wallet to log into a website without needing a password. They simply use their credential to log in, thereby providing "password-less access."

Embodiments may provide at least some of the following capabilities:
Self-service;
Input data once;
Multiparty workflow management;
Systemic archive and audit;
Easy to access archive and audit;
One global standard across multiple counterparties (banks);
No document loss;
Secure environment;
Everyone "owns" their own data and documents;
Easy to revoke attestation, authorization, visibility, and access in real-time across multiple participants; and
Various levels of control, attestation, authorization, visibility, and access (e.g., group level, entity level, account level, team level, employee level, document level).

Embodiments may include the following modules:
Information and document upload and exchange module (e.g., KYC requirements, articles of incorporation, tax forms, signature cards, etc.)
Entity onboarding and set-up module;
Identity verification module (e.g., KYC or similar module);
Legal entity identifier attestation module (e.g., Global Legal Entity Identifier Foundation, or GLEIF)
Account opening and product set-up module;
Authorized signer set-up, maintenance, and reporting module;
File format testing module (e.g., for payments, information exchange, document exchange).

In embodiment, access may be provided via a web portal, email, SWIFTnet File Acct with eBAM, by ERP integration, gateways, APIs, etc.

In embodiments, the distributed ledger may provide at least some of the following features:
Verification of e-signatures via private key signatures (e.g., sign in with your private key);
An audit trail of signatures that may be ordered and timestamped (the audit trail may be stored off-chain; a hash and pointer may be stored on-chain);
Masking of actual account numbers or private identifiers through use of public key address (e.g., attestations may not be recorded on-chain; identities may be recoded on-chain but may be masked) and auto-generation of masked addresses (e.g., masking real identities);
Legal document to smart contract connectivity;
Version control and/or document validation by document hash;
Smart contract-based enforcement of document and info access;
Smart contract-based enforcement of corporate-level authorized signer rules (e.g., need 3 authorized signers to sign for an entity);
Real-time activation/deactivation of authorized signers or employees via attestation revocation; and
An audit trail of authorized signer set-up and subsequent activity.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen, for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-based method for providing attestations for an identity consumer from an identity provider to a relying party, comprising:
    providing, by the identity consumer to an identity provider server for the identity provider, identity consumer information;
    validating, by the identity provider server, the identity consumer information;
    receiving, by the identity provider server, a root attestation from a system operator that authorizes the identity provider server to issue identity provider attestations;
    generating, by the identity provider server, an identity provider attestation comprising an attestation about the identity consumer information;
    generating, by the identity provider server, a nested attestation comprising the identity provider attestation and the root attestation, wherein the nested attestation establishes a chain of trust by building the identity provider attestation on the root attestation in a single attestation;
    receiving, by an identity consumer computer program executed by an electronic device for the identity consumer and from the identity provider server, a notification that the nested attestation is available;
    requesting, by the identity consumer computer program, the nested attestation from the identity provider server;
    downloading, by the identity consumer computer program, the nested attestation to an identity consumer electronic wallet for the identity consumer;
    committing, by the identity provider server, the nested attestation to a distributed ledger, wherein the distributed ledger maintains a current status for the root attestation and the identity provider attestation;
    receiving, by the identity consumer computer program and from a relying party computer application for the relying party, a request for the nested attestation;
    generating, by the identity consumer computer program, a machine-readable code for the nested attestation that is stored in the identity consumer electronic wallet;
    communicating, by the identity consumer computer program and to the relying party computer application, the machine-readable code for the nested attestation;
    extracting, by the relying party computer application, the nested attestation from the machine-readable code;
    identifying, by the relying party computer application, the root attestation and the identity provider attestation from the nested attestation;
    verifying, by the relying party computer application and on the distributed ledger, that the root attestation and the identity provider attestation are valid and active; and
    executing, by the relying party computer application, an action based on reliance on the verification.

2. The computer-based method of claim 1, wherein the identity provider attestation comprises a license, a certificate, a credential, or an authorization.

3. The computer-based method of claim 1, wherein the identity provider comprises one of a financial institution, a government agency, an employer, and a legal entity.

4. The computer-based method of claim 1, wherein the identity provider attestation comprises an identification of an attestor, an identification of an attestee, a type of identity provider attestation, and a date of issuance.

5. The computer-based method of claim 1, wherein the identity consumer electronic wallet comprises a wallet application, a mobile wallet, or a web-based wallet.

6. The computer-based method of claim 1, wherein the current status of the root attestation or the identity provider attestation comprises valid, expired, or revoked.

7. The computer-based method of claim 1, wherein the relying party computer application periodically verifies the current status of the root attestation or the identity provider attestation using the distributed ledger.

8. The computer-based method of claim 1, wherein the relying party receives a notification that the root attestation or the identity provider attestation is revoked or expired from the distributed ledger.

9. A computer-based method for sending an object using attestations, comprising:
    providing, by an identity consumer computer program executed by an identity consumer electronic device to an identity provider server for an identity provider, identity consumer information for an identity consumer;
    receiving, by the identity provider server, a root attestation from a system operator that authorizes the identity provider server to issue identity provider attestations;
    generating, by the identity provider server, an identity provider attestation comprising an attestation about the identity consumer information;

generating, by the identity provider server, a nested attestation comprising the identity provider attestation and the root attestation, wherein the nested attestation establishes a chain of trust by building the identity provider attestation on the root attestation in a single attestation;

receiving, by the identity consumer computer program, an identity of an object to sign;

requesting, by the identity consumer computer program the nested attestation from the identity provider server;

receiving, by the identity consumer computer program, the nested attestation;

storing, by the identity consumer computer program, the nested attestation in an identity consumer electronic wallet for the identity consumer;

retrieving, by the identity consumer computer program, the object;

signing, by the identity consumer computer program, the object with the nested attestation that is stored in the identity consumer electronic wallet by embedding the attestation in the object;

sending, by the identity consumer computer program, the signed object to a receiving party computer program executed by an electronic device for a receiving party;

extracting, by the receiving party computer program, the nested attestation from the object; and verifying, by the receiving party computer program and on a distributed ledger that maintains a current status for the root attestation and the identity provider attestation, that the root attestation and the identity provider attestation are valid and active.

10. The computer-based method of claim 9, wherein the object comprises a document, and the identity provider attestation attests that the identity consumer is authorized to sign the document.

11. The computer-based method of claim 9, wherein the object is a payment, and the identity provider attestation attests that the identity consumer is authorized to make the payment.

12. The computer-based method of claim 9, wherein the object comprises digital currency.

13. The computer-based method of claim 9, wherein the identity provider attestation comprises a license, a certificate, a credential, or an authorization, and further comprises an identification of an attestor, an identification of an attestee, a type of identity provider attestation, and a date of issuance.

14. The computer-based method of claim 9, further comprising:

generating, by the identity provider server, a receiving party attestation comprising an attestation about the receiving party;

generating, by the identity provider server, a receiving party nested attestation comprising the receiving party attestation and the root attestation, wherein the nested attestation establishes a chain of trust by building the receiving party attestation on the root attestation in a single attestation;

receiving, by the identity provider computer program and from the receiving computer program, a request for the object and the receiving party nested attestation; and verifying, by the identity consumer computer program and on the distributed ledger, that the root attestation and the receiving party attestation are valid and active before sending the object to the receiving party.

15. The computer-based method of claim 14, wherein the receiving party attestation attests to an account for the receiving party.

* * * * *